United States Patent

[11] 3,619,066

[72] Inventors Peter Kaiser
Middletown;
Enrique A. J. Marcatili, Rumson, both of N.J.
[21] Appl. No. 805,201
[22] Filed Mar. 7, 1969
[45] Patented Nov. 9, 1971
[73] Assignee Bell Telephone Laboratories, Incorporated
Murray Hill, Berkeley Heights, N.J.

[54] BEAM POSITION AND WIDTH SENSING BY SCATTERING
9 Claims, 9 Drawing Figs.

[52] U.S. Cl. .................................................. 356/122,
350/96 WG, 356/152, 356/153
[51] Int. Cl. ....................................................... G01j 1/42,
G02b 5/14
[50] Field of Search........................................... 350/96
WG; 356/152, 153, 172, 121, 122, 209–211, 199;
250/219 WE

[56] References Cited
UNITED STATES PATENTS
| | | | |
|---|---|---|---|
| 3,316,800 | 5/1967 | Kibler........................... | 350/96 WG |
| 3,423,593 | 1/1969 | Chinnock..................... | 350/96 WG |
| 3,466,111 | 9/1969 | Ring.............................. | 350/96 WG |
| 3,492,485 | 1/1970 | Marcatili...................... | 350/96 WG |
| 3,494,699 | 2/1970 | Gloge........................... | 356/121 |

OTHER REFERENCES
Christian et al., Self-Aligning Optical Beam Waveguides, IEEE Journal of Quantum Electsonics, Vol. QE 3, 6, June 1967, p. 244.

*Primary Examiner*—Ronald L. Wibert
*Assistant Examiner*—J. Rothenberg
*Attorneys*—R. J. Guenther and Arthur J. Torsiglieri

ABSTRACT: Beam position and beam width sensing is accomplished by scattering a small percentage (0.1 percent) of the beam energy. The scattered light is analyzed by an arrangement of three photosensors that compare the energy distribution along different portions of the beam and produce appropriate error signals which are then used to reposition and focus the beam. Scattering is accomplished by means of thin threads disposed across the wavepath.

PATENTED NOV 9 1971 3,619,066

INVENTORS P. KAISER
E. A. J. MARCATILI
BY
ATTORNEY

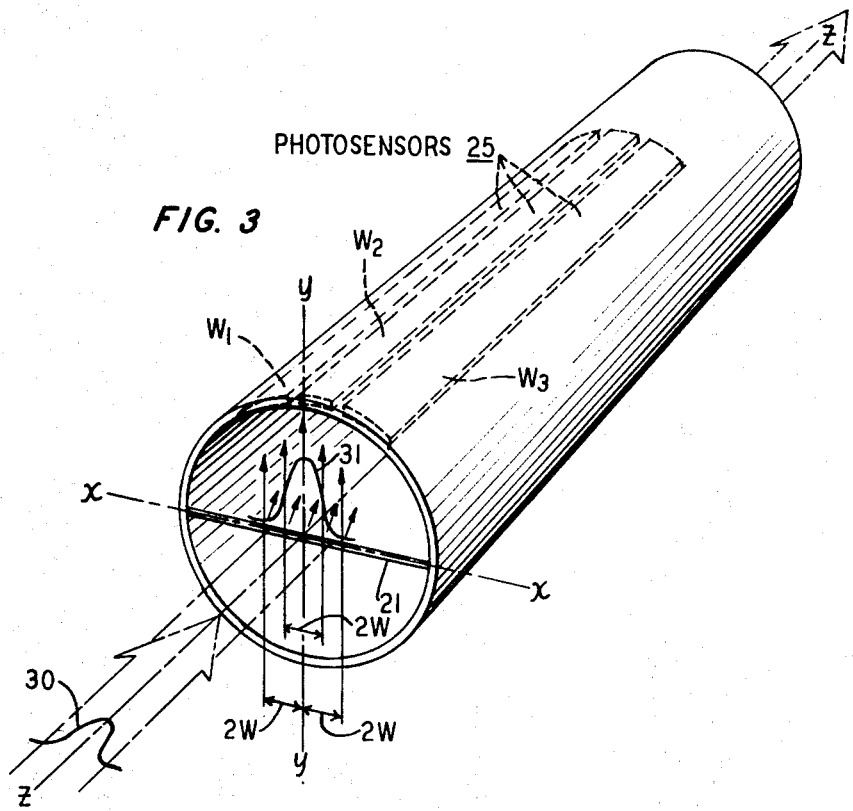
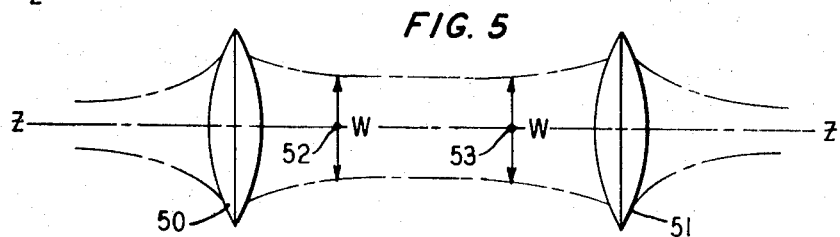
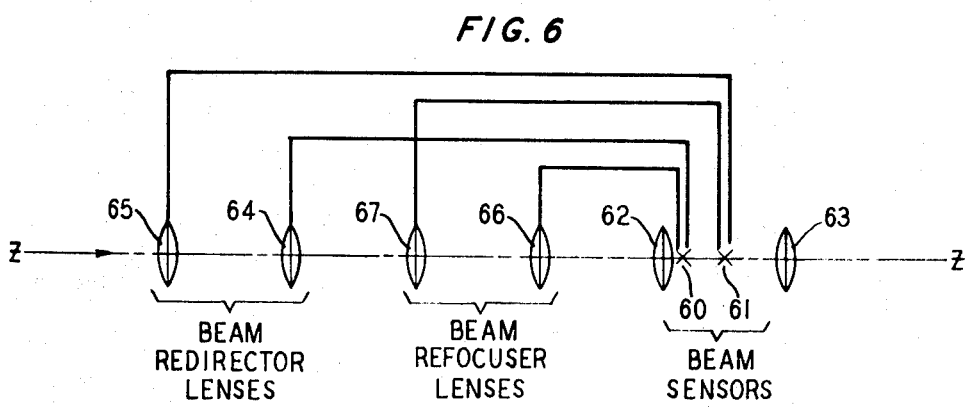

3,619,066

BEAM POSITION AND WIDTH SENSING BY SCATTERING

This invention relates to optical beam position and beam-width sensing arrangements.

BACKGROUND OF THE INVENTION

In his article entitled "Effect of Redirectors, Refocusers and Mode Filters on Light Transmission Through Aberrated and Misaligned Lenses," published in the Oct. 1967 issue of the *Bell System Technical Journal*, pages 1,733 through 1,752, E. A. J. Marcatili calculated the field distortion of a beam propagating through a sequence of identical, misaligned and slightly aberrated lenses. It was found that most of the converted power goes to the first and second higher order modes. More particularly, it was found that correlated and uncorrelated transverse displacement of the lenses comprising the waveguide introduce first order mode distortion which causes, in effect, a deflection of the propagating beam. Since this deflection of the beam from the desired direction of propagation can grow in proportion to the number of lenses, the tolerance requirements imposed upon the lens alignment in an uncompensated system becomes increasingly severe as the number of lenses is increased.

It was further found that as long as the lenses are "perfect," lens misalignment only affects the beam direction, without altering the normal mode beam size or the beam intensity profile. If, on the other hand, the lenses have aberrations, energy is converted to the second order mode and also, to some degree, to still higher order modes which together have the affect of defocusing and distorting the beam. If this tendency is uncorrected, the location of the beam axis becomes obscure and the ability to redirect the beam is greatly diminished.

It is apparent from the above, that any practical beam transmission system requires some means for regularly sensing both the beam position and the beam width, and for utilizing this information to redirect and refocus the beam as required. One such system is described in the above-identified article by Marcatili.

It is the broad object of the present invention to improve and simplify optical beam sensors.

SUMMARY OF THE INVENTION

In accordance with the present invention, beam position and beam width sensing is accomplished by scattering a small percentage (0.1 percent) of the incident beam energy. The scattered energy is analyzed by an arrangement of photosensitive elements that compare the energy distribution along different transverse portions of the beam and produce appropriate error signals which are then used to redirect and refocus the beam. Scattering is accomplished by means of thin threads, diametrically disposed across the beam wavepath.

It is an advantage of the present invention that the beam position and beam width are determined by sampling directly across the beam profile, rather than by sampling the energy distribution about the edges of the beam, as in the prior art.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

FIG. 3, included for purposes of explanation, shows the beam scattering at the beam sensor;

FIG. 5 shows the variation of beam width between lenses;

FIG. 6 shows, in block diagram, a complete beam sensing and beam correction system;

DETAILED DESCRIPTION

Figure 1:
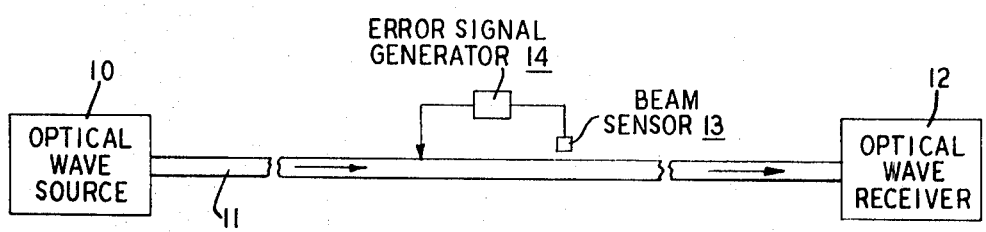
FIG. 1 shows in block diagram an optical wave transmission system including a beam-correcting system.

Referring to the drawings, FIG. 1 shows, in block diagram, a typical optical wave transmission system comprising an optical wave source 10, an optical wave receiver 12 and an optical waveguide 11 connecting said source to said receiver. For the reasons indicated hereinabove, means for sensing the beam position and the beam width are advantageously included at regularly spaced intervals along the waveguide. This is indicated in FIG. 1 by a beam sensor 13 located along guide 11.

The output from sensor 13 is coupled to an error signal generator 14 wherein a correction signal is developed. The latter is then utilized in a manner to redirect and/or refocus the beam. The present invention is particularly related to the beam sensor. However, related apparatus for producing and utilizing the correcting signals will also be considered in some detail.

Figure 2:
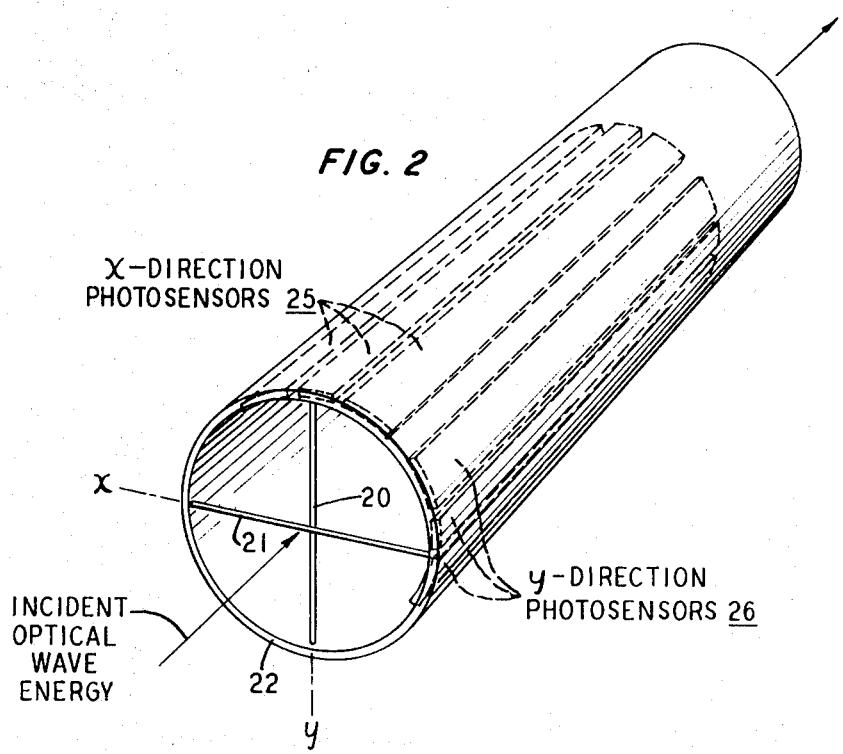
FIG. 2 shows a beam sensor in accordance with the present invention.

FIG. 2 shows a first embodiment of a beam sensor, in accordance with the present invention, utilizing beam-scattering techniques.

Recognizing that the position of a beam can be fully located by reference to two mutually orthogonal axes, the sensor comprises a pair of orthogonally oriented thin threads 20 and 21 extending diametrically across the wave guide enclosure 22. For purposes of identification, the vertically extending thread 20 is referred to as the $y$-direction scatterer and the horizontally extending thread 21 is referred to as the $x$-direction scatterer. As an example, the threads can be made of quartz, but any other material which can be drawn to a sufficiently small diameter can be utilized.

Associated with the scatterers are the multielement photosensors 25 and 26. In this embodiment, each photosensor comprises three longitudinally extending photosensitive strips located along the inner surface of enclosure 22. Photosensor 25, which operates in association with thread 21 and, hence, is referred to as the $x$-direction sensor, is symmetrically located with respect to the $y$-axis. Similarly, photosensor 26, which operates in association with thread 20 and, hence, is referred to as the $y$-direction sensor, is symmetrically located with respect to the $x$-axis.

For purposes of explanation, either the $x$-or the $y$-direction sensor can be considered, it being understood that both operate in the same manner and independently of each other. Accordingly, in FIG. 3, only the $x$-direction sensor, comprising thread 21 and photosensor 25, is shown.

In operation, the incident wave energy impinges upon thread 21. Because thread 21 is very thin, having a diameter of the order of 0.1 $\mu$ to 0.5 $\mu$, over 99.9 percent of the wave energy propagates past the wire. A small fraction, however, of the order of 0.1 percent is intercepted by the thread and scattered in a plane perpendicular to the thread. Most of this energy is scattered in the forward direction with a typical beam width of about ±30°. The scattered energy is intercepted by the three photosensitive elements comprising photosensor 25. Since the same amount of energy is scattered in the upward direction as in the downward direction, the sensitivity of the sensor can be increased by a factor of two by mounting an identical set of photoelements diametrically opposite sensor 25. For purposes of explanation, however, only one set of photosensitive elements is shown. Since the relative intensity distribution of the scattered wave energy is essentially the same as the intensity distribution of the incident beam, the scattered energy provides an accurate picture of the beam profile. Thus, if the incident beam has a Gaussian transverse field distribution along the x-direction, as represented by curve 30, the energy scattered in the direction of sensor 25 also has a Gaussian field distribution, as represented by curve 31. The precise proportion of the scattered wave energy that is intercepted by each of the three photosensitive elements will, of course, depend upon its relative cross-sectional dimensions and its location. Assuming, for example, that all three elements have the same length, the amount of energy intercepted by each will vary as a function of its width. In the special case where all the widths are equal, i.e., $W_1=W_2=W_3$, the center element will intercept the largest proportion of the scattered energy because of the nature of a Gaussian distribution. Of particular interest, however, is the case where all three elements intercept equal portions (i.e., one-third) of the energy scattered from a properly focused, on-axis beam. This preferred condition is obtained when the width $W_2$ of the center element is made equal to 0.432W, where W is the 1/e half-width of the beam. The minimum width of each of the two outer strips to intercept an equal amount of the scattered energy is then given as $W_1=W_3=1.784W$, where it is assumed that all the energy is included within a region defined by ± 2W.

When proportioned in the manner indicated, a properly focused, on-axis beam excites all three photosensitive elements of photosensor 25 equally. If, on the other hand, the beam, though on-axis, is defocused the distribution of energy is disturbed so that proportionately more of the energy is scattered onto the two outer elements and less onto the center element. This imbalance can then be detected, as will be explained in greater detail hereinbelow, and used as a means of generating a refocusing error signal. If, on the other hand, the beam is properly focused but deflected off-axis in either the ±x-direction, the energy scattered onto the two outer elements is unequal, with more of the energy received by the outer element towards which the beam is deflected and less received by the opposite outer element away from which the beam is deflected. This imbalance can also be sensed and used to generate a redirecting error signal. Clearly, both of these deviations from the normal condition can be simultaneously sensed and detected and both redirecting and refocusing error signals generated, as will now be considered.

Figure 4:
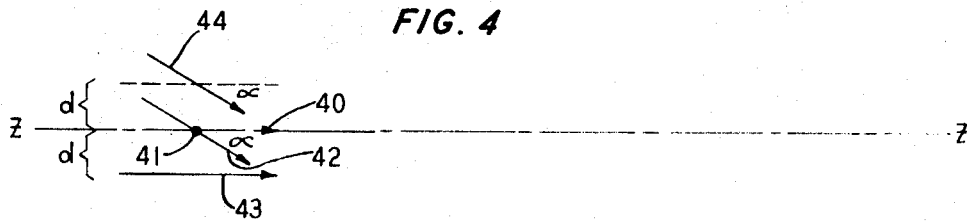
FIG. 4, included for purposes of explanation, shows various possible beam orientations.

FIGS. 4 and 5, included for purposes of explanation, illustrate the various beam conditions that can prevail at the sensor location. For example, the axis of a properly oriented beam, represented by arrow 40 in FIG. 4, is collinear with the guide axis Z—Z. An improperly directed beam, on the other hand, can be misdirected in one, or both of two ways. It can pass through the guide center at the sensor location but be directed at an angle A with respect to the guide axis, as indicated by arrow 42, or it can be directed parallel to axis Z—Z but displaced a distance d from the guide center, as indicated by arrow 43. Arrow 44 represents a beam whose axis is both displaced a distance d from the guide center, and misdirected at an angle A to the guide axis. Thus, in order to fully determine the beam direction, two parameters must be determined. This requires two separate measurements.

Similarly, with respect to the beam focusing two separate measurements must be made since a single measurement can only indicate the beam width but does not specify whether the beam is narrowing or expanding. This is indicated in FIG. 5, which shows the beam width variations between a pair of lenses 50 and 51. As can be seen, the beam width at position 52 is the same as the beam width at position 53. However, whereas the beam is narrowing at position 52, it is expanding at position 53.

Thus, in order to fully define the condition of the beam, two measurements of the beam orientation, and two measurements of the beam width must be made. Accordingly, a complete system will include, as shown in FIG. 6, a pair of beam sensors 60 and 61 longitudinally displaced along the guide axis. To insure that the information provided by the two sensors is not redundant, the sensors are located at relatively different positions with respect to the guide lenses. Thus, in FIG. 6, one sensor 60 is located immediately adjacent to one of the guide lenses 62, whereas the other sensor 61 is advantageously located midway between lens 62 and the next adjacent lens 63 along the direction of wave propagation, which is assumed to be from left to right.

As explained hereinabove, each sensor provides both beam orientation and beam width information. Accordingly, one signal from each sensor is fed back to a preceding lens either to reposition the controlled lens, or to change its focal length. Thus, in FIG. 6, one signal from sensor 60 is fed back to one of the beam redirector lenses 64 and one signal is fed back to a beam refocuser lens 66. Similarly, one signal is fed back from sensor 61 to beam redirector lens 65 and one signal is fed back to beam refocuser lens 67.

Figure 7:
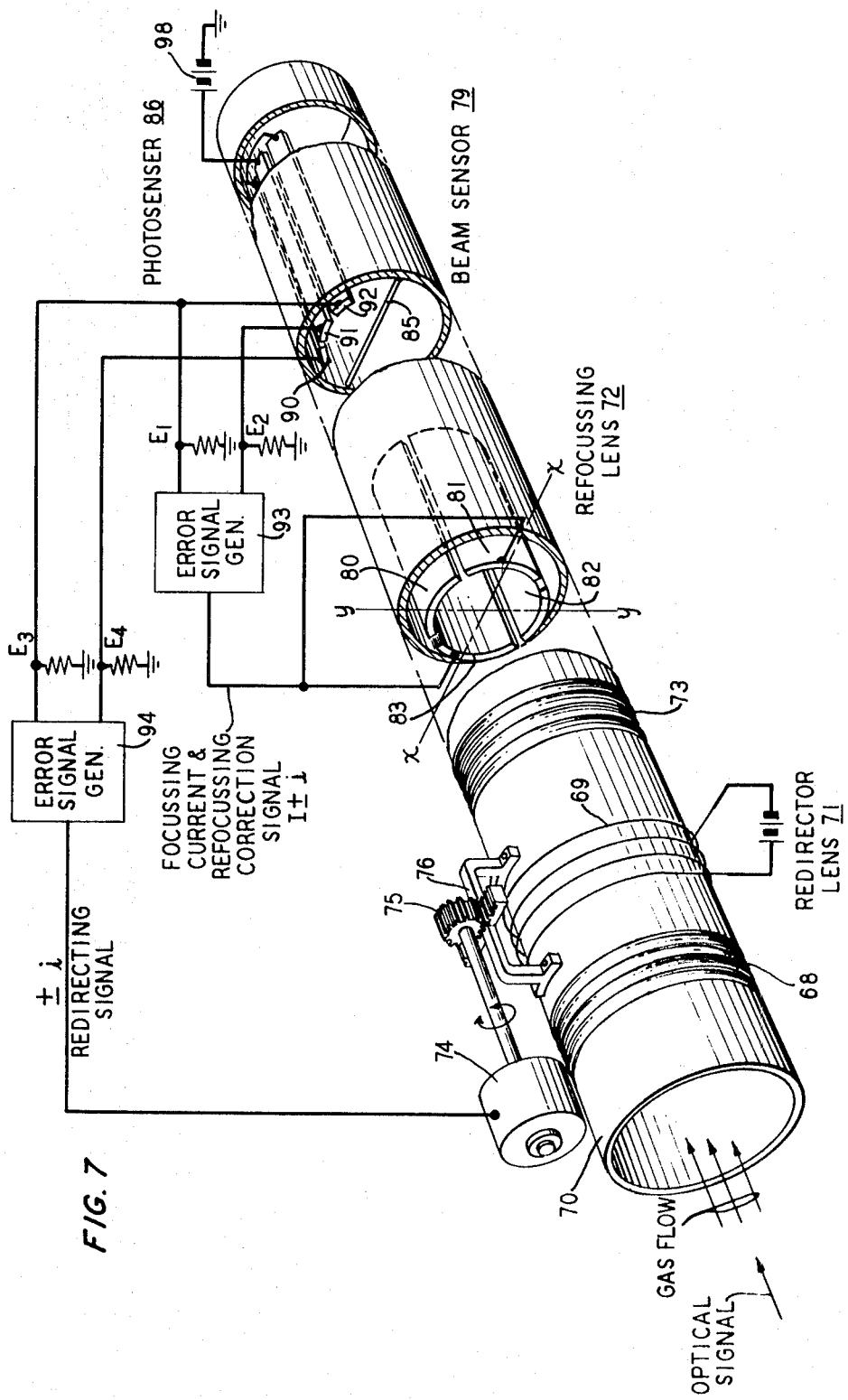
FIG. 7 shows the various elements of the correction system of FIG. 6 in greater detail.

FIG. 7 shows, in somewhat more detail, the various components of a beam redirector and refocuser system including one of the redirecting lenses 71, one of the refocusing lenses 72 and one of the sensors 79. Because the present invention is particularly adapted for use in optical systems employing thermal gaseous lenses, reference will be made to such lenses in the discussion that follows. Accordingly, the waveguide depicted in FIG. 7 comprises an enclosure 70 within which a transparent gas is flowing, and along which the optical beam propagates. The first thermal lens 71, of the type described in U.S. Pat. No. 3,410,627, comprises a heating coil 69 which surrounds the wavepath and which, thereby, establishes a radial density gradient across the flowing gas. As explained in the above-identified patent, this has the effect of producing lens action. In order to reposition this lens, the lens enclosure is coupled to the rest of the enclosure 70 by means of flexible coupling 68 and 73 which permit transverse displacement of the lens relative to the rest of the system. This displacement is typically produced by a motor 74 which is mechanically coupled to the lens by suitable gears 75 and a bracket 76.

The second thermal lens 72 is of the type described by Marcatili in his above-identified publication. In this lens, the heating member is divided into four independently controllable heating elements 80, 81, 82 and 83. This permits the temperature gradient to be independently controlled along two mutually perpendicular directions $x$ and $y$. Thus, by varying the temperature of elements 81 and 83, the focusing along the x-direction is changed, while the y-direction focusing is controlled by the temperature of heating elements 80 and 82.

The sensor 79 includes an x-direction scatterer 85 and the associated photosensor 86.

Two of the photosensor segments 91 and 92 connect to a first error signal generator 93 which compares the two signals produced by these elements. Assuming the latter to be photoresistors, the resistance of each will vary in response to the amount of scattered energy incident thereon. As a result, the current provided by a series-connected battery 98 will also vary, producing signals $E_1$ and $E_2$ at the error generator that are proportional to the scattered wave energy intercepted by photosensor segments 91 and 92. The generator can be a simple difference amplifier whose output provides the heater current for elements 81 and 83 of lens 72. In particular, with the input signals $E_1$ and $E_2$ indicative of proper focusing (i.e., $E_1=E_2$) the output current is I($i=0$). If, however, the relative amplitudes of $E_1$ and $E_2$ change, an additional heater current component $\pm i$ is produced which either increases or decreases the total heater current, depending upon the relative amplitudes of $E_1$ and $E_2$.

Signals are also taken from sensor elements 90 and 92 and coupled to a second error signal generator 94. The latter can also be a difference amplifier which compares the signals $E_3$ and $E_4$ generated at the sensor. When the signals $E_3$ and $E_4$ indicate proper beam orientation, the output signal from error generator 94 is zero. A change in the relative amplitudes of signals $E_3$ and $E_4$, on the other hand, will produce an output signal $\pm i$ which drives motor 74 and, thereby, displaces lens 71 in the ±x-direction relative to the rest of the waveguide. The displacement continues until the error signal is reduced to zero, indicating that the beam is centered at the sensor location.

Since, as indicated above, two measurements are required, there would be a second, similar arrangement of beam sensors and lenses. In addition, each sensor would have a y-direction scatterer and associated photosensor that would control, in FIG. 7, the heater current to heating elements 80 and 82, and the redirection signal to a second motor which would either displace lens 71 in the y-direction, or control a second lens.

While the redirection lenses and the refocusing lenses were indicated as being separate lenses, it will be understood that lens 72, for example, can just as readily be used for both purposes. That is, lens 72 can also be displaced in response to the repositioning signal and, thereby, provide both refocusing and redirecting. It will also be understood that the control systems described are merely illustrative. For example, other arrangements, such as that described in the copending application by D. H. Ring, Ser. No. 605,741, filed Dec. 29, 1966 and assigned to applicants' assignee, can be used to control the position of the redirector lens.

Figure 8:
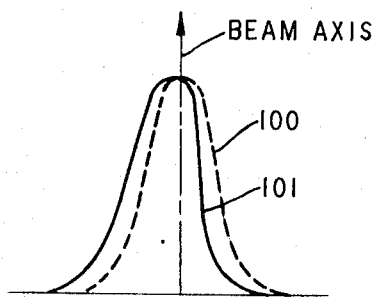
FIG. 8 shows an intensity profile of an asymmetric beam.

In addition, it should be noted that many other arrangements of the photosensors are possible. For example, as was indicated hereinabove, lens aberrations convert some of the beam wave energy into higher order modes. While the typical low level of second order mode wave energy, normally present in a well designated system, tends to defocus the beam, higher order mode wave energy in general tends to distort the beam so that it is no longer symmetrical with respect to the beam axis. This is illustrated in FIG. 8 wherein curve 100, shown dotted, is the profile of a symmetric beam, whereas curve 101, shown in solid line, is the profile of an asymmetrically distorted beam.

Figure 9:
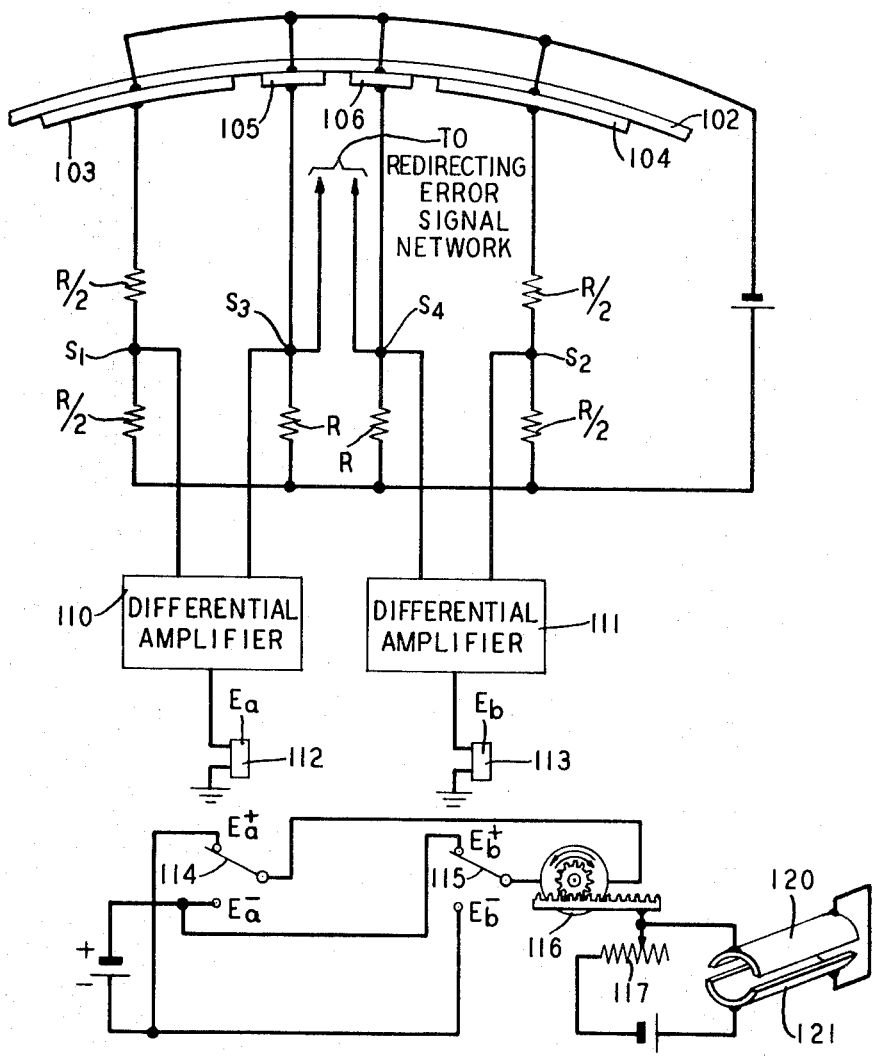
FIG. 9 shows a four-element photosensor for refocusing and redirecting an asymmetric beam.

If an asymmetric beam is applied to the three-element photosensor described above, the beam will be refocused and redirected, in the manner described in connection with FIG. 7, so that each of the three photosensitive elements intercepts equal amounts of the scattered power. The beam, nevertheless, will not be properly centered with respect to the guide axis. That is, the beam axis, which identifies the region of maximum beam intensity, will not be aligned with the guide axis. This would be detrimental during subsequent filtering through, for example, a sequence of lenses with small apertures since the losses in such a filter are relatively high if the beam axis does not pass through the lens centers. To avoid these difficulties, the sensor described above can be modified so as to insure that the beam axis is properly aligned even when the beam is distorted. The modification involves longitudinally subdividing the center element of the above-described three-element sensor into two equal portions. The resulting four-element sensor is represented in FIG. 9 which includes a portion of a guide enclosure 102; two outer photosensitive elements 103 and 104; and two inner photosensitive elements 105 and 106. In a preferred embodiment, each of the outer elements 103 and 104 are proportioned to intercept one-third of the scattered wave energy. The two inner elements 105 and 106 together intercept the remaining one-third. Thus, each intercepts one-half of one-third, or one-sixth of the scattered wave energy.

Repositioning of the beam is accomplished by sensing the signals $S_3$ and $S_4$ produced in response to the energy intercepted by sensor elements 105 and 106, and redirecting the beam until signal $S_3$ equals signal $S_4$. When this condition is satisfied, the beam axis is aligned with the guide axis. The need for refocusing is indicated when the two differences $S_1-S_3$ and $S_2-S_4$ have the same polarity. Accordingly, signals $S_1$ and $S_3$ are coupled to a first differential amplifier 110 which produces an output signal $E_a$ which is either positive or negative, depending upon the relative amplitudes of $S_1$ and $S_3$. Signal $E_a$ is coupled to a polarized relay 112 which closes one of two different sets of contacts depending upon the polarity of $E_a$. Similarly, $S_2$ and $S_4$ are coupled to a second differential amplifier 111 whose output $E_b$ is coupled to a second polarized relay 113.

When signals $S_1$, $S_2$, $S_3$ and $S_4$ are such that $E_a$ and $E_b$ are both positive, relay contacts 114 and 115 are closed in the $E_a^+$ and $E_b^+$ positions, energizing motor 116 in a first polarity. This causes motor rotation in a corresponding direction which moves the contact arm of potentiometer 117 in a manner to readjust the focusing current through the lens heating elements 120 and 121. Proper focusing is indicated when the polarity of either $E_a$ or $E_b$ reverses. This causes one of the relay contacts to switch, open-circuiting the motor circuit. Similarly, if $E_a$ and $E_b$ are both negative, relay contacts 114 and 115 are closed in the $E_a^1$ and $E_b^1$ positions, energizing motor 116 in the opposite polarity and, thereby, causing motor rotation in the opposite sense.

The arrangement of resistors R and R/2 are required because of the power distribution among the sensor elements explained hereinabove.

In the two illustrative embodiments described hereinabove, the photosensors are located along the inner surface of the waveguide enclosure. Alternatively, they can be separately fabricated on a planar substrate and inserted into the enclosure, or on different substrates and arranged in a staggered configuration to reduce crosstalk. Basically, all that is necessary is that they be in a position to intercept a portion of the scattered wave energy. Thus, the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

We claim:

1. In an optical beam waveguide including a plurality of lenses longitudinally spaced therealong, beam position and beam width sensing means comprising:
   means comprising a thin thread extending transversely across said waveguide for scattering a small fraction of less than 1 percent of the wave energy incident thereon; and
   a photosensor for measuring the intensity distribution of said scattered wave energy.

2. The waveguide according to claim 1 wherein said scattering means comprises two threads oriented along two mutually perpendicular directions transverse to the direction of beam propagation; and
   wherein a separate photosensor measures the wave energy scattered by each of said mutually perpendicular scattering means.

3. The sensing means according to claim 1 wherein said photosensor comprises three photosensitive elements.

4. The sensing means according to claim 3 wherein said elements are proportioned to intercept equal amounts of the wave energy scattered from a properly oriented and properly focused beam.

5. The sensing means according to claim 1 including means for refocusing and for repositioning said beam in response to said photosensor measurements.

6. The sensing means according to claim 1 wherein said photosensor comprises four photosensitive elements.

7. The sensing means according to claim 6 wherein the two outer of said four elements are proportioned to intercept one-third of the energy scattered from a a properly oriented and properly focused beam; and
   wherein each of the two inner of said four elements is proportioned to intercept one-sixth of said scattered energy.

8. The sensing means according to claim 7 wherein the signals produced by said two inner elements are used to reposition the beam; and
   wherein the signals produced in response to the scattered energy intercepted by the outer elements and the respective adjacent inner elements are used to refocus the beam.

9. The sensing means according to claim 8 wherein said beam is refocused when the two differences $S_1-S_3$ and $S_2-S_4$ have the same polarity, where $S_1$ and $S_2$ are the signals produced in response to the scattered energy intercepted by the two outer elements and $S_3$ and $S_4$ are the signals produced in response to the scattered energy intercepted by the adjacent inner elements.